Jan. 5, 1926. Re. 16,244

J. JUDELSON

DRIER

Original Filed July 28, 1923 2 Sheets-Sheet 1

INVENTOR

JULIUS JUDELSON.

BY

ATTORNEY

Jan. 5, 1926. Re. 16,244

J. JUDELSON

DRIER

Original Filed July 28, 1923 2 Sheets-Sheet 2

INVENTOR
JULIUS JUDELSON.
BY
Morris Bernstein
ATTORNEY

Reissued Jan. 5, 1926.

Re. 16,244

UNITED STATES PATENT OFFICE.

JULIUS JUDELSON, OF NEW YORK, N. Y.

DRIER.

Original No. 1,513,597, dated October 28, 1924, Serial No. 654,362, filed July 28, 1923. Application for reissue filed October 24, 1925. Serial No. 64,701.

*To all whom it may concern:*

Be it known that I, JULIUS JUDELSON, a citizen of the United States, residing at New York city, in the borough of Bronx, county of Bronx, city and State of New York, have invented a new and useful Improvement in Driers, of which the following is a specification.

This invention relates to improvements in driers. More particularly it is directed to a drier of the character described adapted for use in apartment houses where the driers ordinarily employed have a plurality of separate drying compartments.

One object of the invention is to provide a drier of the character described with a heating apparatus having separate heating units so constructed and arranged as to permit of heating one or more compartments separately or one or more pairs of compartments separately, or heating a plurality of compartments simultaneously.

Another object is to provide heating apparatus of the character described which shall utilize to a maximum degree the heat units from the burner or burners, and insure an even temperature throughout the interior of the drier.

A further object is to provide apparatus of the character described which shall insure a proper and efficient circulation of dry heated air through the drier so as to rapidly and uniformly dry the articles or material therein without injury thereto, the gases or fumes from the heating apparatus being kept from direct contact with the interior of the drying compartment.

A still further object is to provide in a drier of the character described, a heating apparatus which shall be efficient and economical in operation to a high degree and comparatively cheap to manufacture.

Other objects of this invention will in part be obvious and in part hereinafter pointed out.

I accomplish the foregoing and other objects in a general way by means of a multiple heating unit of the improved construction hereinafter described, and so arranged as to heat one drying compartment, or a pair of drying compartments separately, or a plurality of drying compartments, or pairs of compartments simultaneously.

The invention accordingly consists in the features of construction, combinations of elements and arrangement of parts which will be exemplified in the construction hereinafter described, and of which the scope of application will be indicated in the following claims.

In the accompanying drawing, in which is shown one of the various possible illustrative embodiments of this invention, Fig. 1 is a sectional plan view of one double heating unit;

Figures 1, 2, 3:
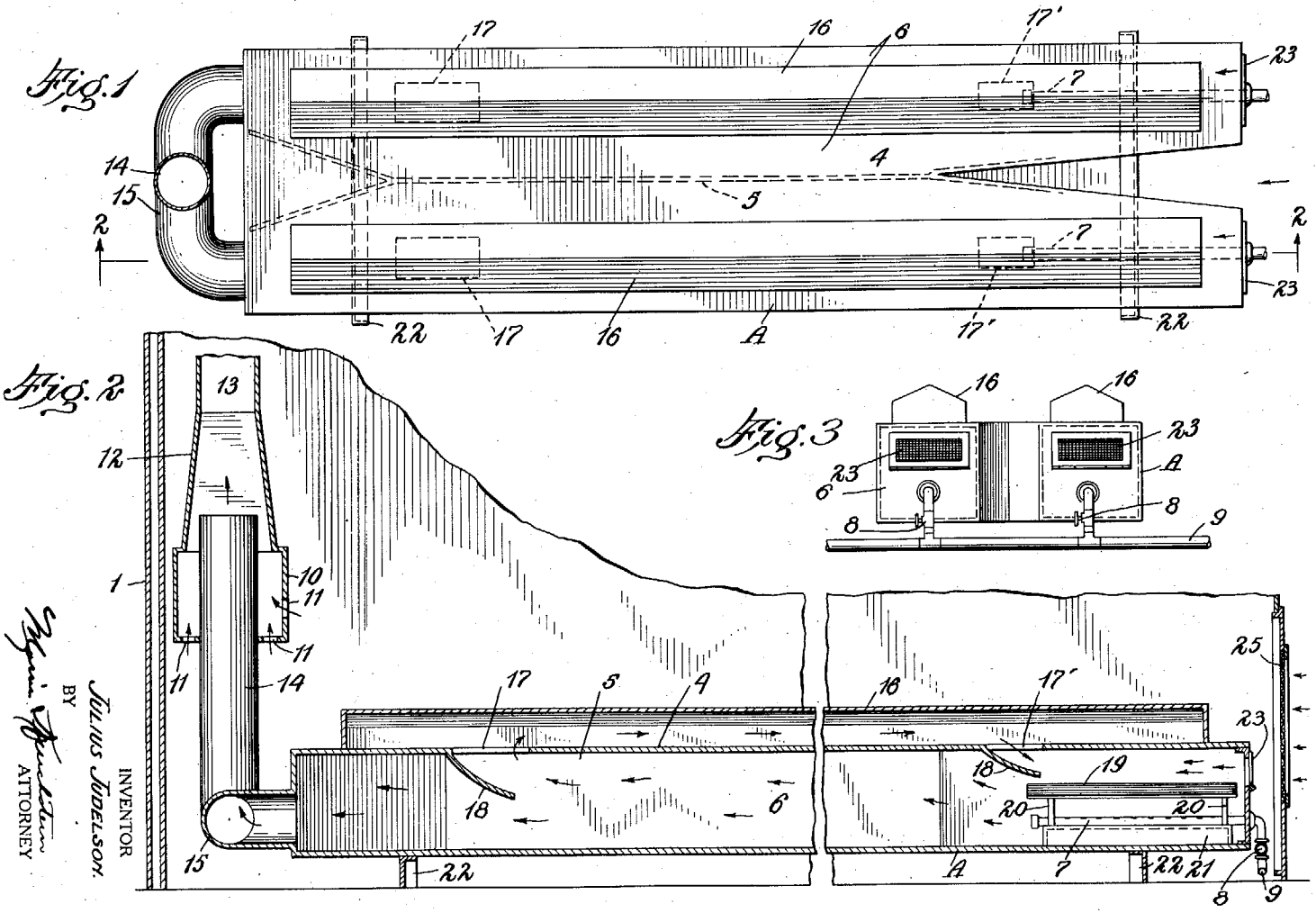
Fig. 2 is a view in vertical longitudinal section through a portion of the drier casing and through the heating unit, the section through the latter being taken on line 2—2 in Fig. 1.
Fig. 3 is a view in front end elevation of the heating unit shown in Fig. 1.
Figure 4:
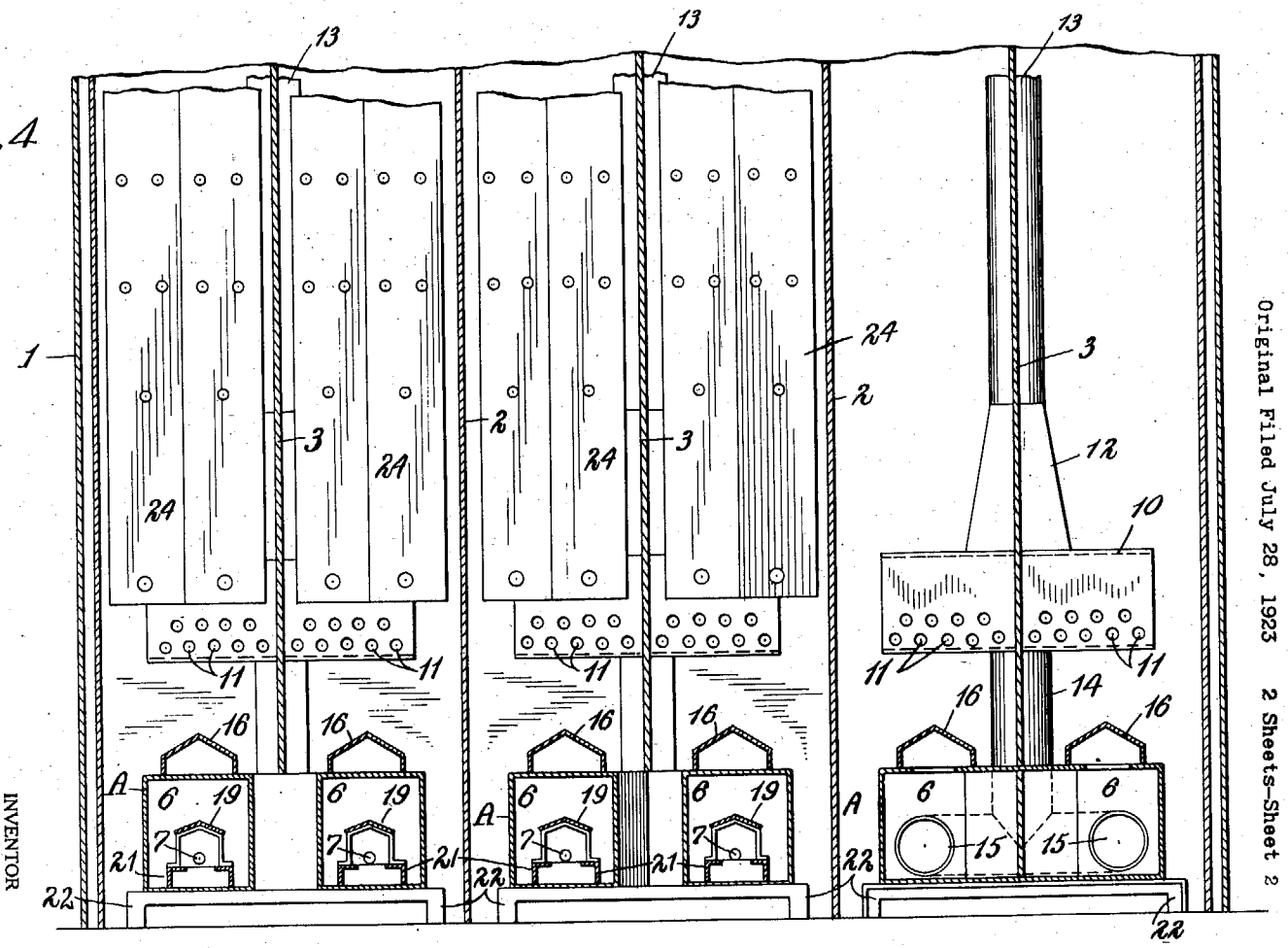
Fig. 4 is a view in transverse section through the drier and the heating units, the view of the two double units at the left being taken through the front portion of the drier, and the view of the unit at the right being taken through the rear of the drier.

Referring in detail to the drawing, 1 represents a drier casing of any approved construction but which is preferably divided by partitions 2 into a series of double compartments, in each of which a shorter partition 3 is provided to divide each double compartment into separate drying chambers.

Each double compartment is provided in its lower portion with a double heating unit A, which serves to heat both chambers of the double compartment, and which will now be described in detail.

Each double heating unit A comprises an elongated flue box 4, of general V-shape in plan at its forward end, and having a longitudinal partition 5 therein which is of general V-shape at its rear end, and co-operates with the V-shaped forward end of the box to divide the box into a pair of relatively long flues 6.

In the forward portion of each flue 6 a gas burner 7 or other heating element is located, said burner being controlled by cocks 8 and supplied with fuel by a pipe 9.

Within each double compartment of the casing 1, and at the rear thereof, I provide a relatively wide box 10 extending into the adjacent drying chambers and which is perforated in its front and bottom as shown at 11. This box 10 is provided on its top at its center with a tapering outlet 12 and the latter communicates at its upper end with a chimney 13.

A vertical pipe 14 is connected by a Y-coupling 15 with the inner ends of the pair of flues 6 and projects upwardly through the box 10 and terminates in the tapering outlet 12 thereof.

On top of the flue box A and directly above each flue 6, return flues 16 are located. These return flues are preferably of box like form, appreciably smaller in diameter than the flues 6, and preferably of inverted V-shape in cross section. Openings 17, 17′ are provided in the top of flues 6 connecting the latter with the return flues 16, and these openings are spaced an appreciable distance from the ends of the flues.

Forwardly and downwardly curved baffles 18 are provided in the flues 6 below the openings 17 to properly direct the circulation of air, and it will be noted that the rear openings 17 and baffles 18 are larger than the forward openings and baffles, to insure best results.

Each burner 7 is provided with an elongated baffle 19 above the same. These baffles are preferably inverted V-shape in cross-section and are supported on brackets 20 resting upon burner platforms 21. The heater is supported above the floor of the casing 1 on legs 22 or other suitable mounting.

The forward end of each flue 6 is provided with a screened air inlet door 23 to admit the necessary air to aid combustion, and for circulation through the apparatus.

In each of the single compartments of the drier casing 1, are suitable supporting racks 24 for the articles or materials to be dried, and each double heating unit serves to heat and dry the articles in two of these single compartments, as will now be explained.

The operation is as follows:—

Air enters the forward end of the flue 6. Some of this air used up in combustion in the burners, but the main portion thereof is heated by the burners to the desired temperature so as to provide a circulating heating medium which circulates through the flues 6 and 16 and transmits its heat to the air in the drying compartment above the heating units. The heated air flows through flue 6 towards the rear end thereof where at the opening 17 a large portion thereof passes through said opening into the flues 16 and is returned into flue 6 through the opening 17′ at the other end for recirculation. Some of the air in flue 6 passes directly into the Y-coupling 15 and thence upward through pipe 14 into the box, outlet 12 and up the chimney 13. The recirculated, heated air is reheated as it passes over the flue 6 and near the burners and then passes out through the rear end of the flue 6 in the manner just described. The direction of the flow of air is indicated by the arrows in Fig. 2.

The upward draft in the chimney 13 is effectively aids this circulation and at the same time draws the moisture laden air in the drying compartments through the openings 11 of the box 10, thus exhausting the moist air through the chimney 13, as will be readily understood.

It will be understood, of course, that each heating unit may be operated independently, or all of the heating units operated simultaneously as desired.

It will be noted that the heating apparatus is a separate and distinct unit spaced and sealed from the drying compartment so that none of the gases or noxious fumes or vapors coming from the fabrics enter the drying chamber, thus eliminating all possible injury therethrough to the materials or articles being dried.

I have found that with the apparatus above described, very efficient, rapid and economical drying compartments may be effected with the maintenance of a uniform temperature throughout the drying compartments.

It will thus be seen that there is provided apparatus in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. In a drier, a heating unit comprising an elongated box, a longitudinal partition in the box dividing the same into a pair of main flues, and a return flue on top of the main flues and communicating therewith.

2. In a drier, a heating unit, comprising an elongated box, a longitudinal partition in the box dividing the same into a pair of main flues, and a return flue on top of the main flue and communicating therewith, said return flue being of an appreciably smaller cross-sectional diameter than the main flues.

3. In a drier a heating unit comprising an elongated box, a longitudinal partition in the box dividing the same into a pair of main flues, and a return flue on top of the main flue and communicating therewith, said return flue being of an appreciably smaller cross-sectional diameter than the main flues, and being of substantially inverted V-shape in cross-section.

4. In a drier, a heating unit comprising an elongated box, a longitudinal partition in the box dividing the same into a pair of main flues, and a return flue on top of the main flues and communicating therewith, said main flues having downwardly projecting baffles at the points of communication with the return flues.

5. A double heating unit comprising a box, a longitudinal partition in the box dividing the same into a pair of main flues, a heating element in the forward portions of the main flues, and return flues on top of the main flues.

6. A double heating unit comprising a pair of box flues, return flues above the box flues, heating elements in the forward ends of the box flues, a perforated air outlet box, a chimney connected to the box, a coupling communicating with the rear ends of the box flues and a pipe connected to said coupling and extending through the box into the chimney.

7. A drier comprising a casing, vertical partitions dividing the casing into compartments, double heating units in the lower portion of the compartments, and partitions positioned centrally relatively to the double heating units and dividing the compartments into separate chambers.

8. A device as set forth in claim 7 in which air outlet boxes are provided in both chambers of each compartment and with which the outlets of the double heating units are in communication.

9. In a drier having a casing, a heating unit therefor extending substantially the entire length of the bottom of the casing and comprising an elongated tubular portion, a burner within said portion at one end thereof, and venting means connecting with the opposite end of said portion.

10. In a drier having a casing, a heating unit therefor extending substantially the entire length of the bottom of the casing and comprising an elongated tubular portion, a burner within said portion at one end thereof, and venting means connecting with the opposite end of said portion, said means having openings communicating with the interior of the casing above said unit.

11. In combination with a drier casing of the character described, a heating unit comprising a conduit member, a burner within said member at one end thereof, and means for venting the unit connected to the opposite end of said member, said means including a passage communicating with the interior of the drier casing.

12. A drier of the character described comprising a casing having a venting flue and a heating unit in said casing at the bottom thereof, said unit comprising a plurality of conduit members, heating means connecting with one end of each of said members and means joining the opposite ends of said member to a venting flue.

13. A drier of the character described comprising a casing having a venting flue, and a heating unit in said casing at the bottom thereof, said unit comprising a plurality of conduit members, heating means connecting with one end of said members and means joining the opposite ends of said members to a venting flue, said means having a perforated portion communicating with the interior of the casing to permit drawing off of the moist laden air therefrom.

14. In a drier of the character described, a heating unit comprising a plurality of parallelly aligned elongated tubular members, heating means connecting with one of the ends of each of said members, and a chimney connecting the opposite end of said members serving as a vent for said unit.

15. In combination with a drier casing of the character described, a heating unit comprising a plurality of tubular members parallelly extending substantially the length of the bottom of said casing, heating means within said members, and a venting flue for said unit, said means and flue being positioned on opposite ends of said members respectively.

16. In combination with a drier casing of the character described, a heating unit comprising a plurality of tubular members parallelly extending substantially the length of the bottom of said casing, heating means within said members and a venting flue for said unit, said means and flue being positioned on opposite ends of said members, said flue having passages communicating with the interior of said casing to permit drawing off of the moisture-laden air therefrom.

17. A drier of the character described comprising a casing, a heating unit extending along the bottom interior side of said casing, said unit including a plurality of flues parallelly disposed, heating elements in one of the ends of the flues, a coupling joining the opposite end of the flues together, and venting means connected to said coupling.

18. A drier of the character described comprising a casing, a heating unit extending along the bottom interior side of said casing, said unit including a plurality of flues parallelly disposed, heating elements in one of the ends of the flues, a coupling joining the opposite end of the flues together, and venting means connected to said coupling, said means having through passages communicating with the upper interior portion of the casing over said unit.

Signed at New York city, in the county of New York and State of New York, this 14th day of November, 1925.

JULIUS JUDELSON.